United States Patent
Whitcroft (10) Patent No.: US 6,850,225 B1
(45) Date of Patent: Feb. 1, 2005

(54) COLOR-CODED TACTILE DATA-ENTRY DEVICES

(76) Inventor: Jerome Eymard Whitcroft, 71 Harley Street, Bendigo, Victoria, 3550 (AU)

(*) Notice: Subject to any disclaimer, the term of this patent is extended or adjusted under 35 U.S.C. 154(b) by 0 days.

(21) Appl. No.: 09/297,363

(22) PCT Filed: Oct. 31, 1997

(86) PCT No.: PCT/AU97/00730

§ 371 (c)(1),
(2), (4) Date: Apr. 30, 1999

(87) PCT Pub. No.: WO98/19227

PCT Pub. Date: May 7, 1998

(30) Foreign Application Priority Data

Oct. 31, 1996 (AU) .............................................. PO 3338

(51) Int. Cl.[7] .............................................. G09G 5/00
(52) U.S. Cl. ...................... 345/168; 345/169; 345/170; 345/176; 434/227; 434/233; 400/487; 400/489; 341/73; 341/20; 341/21; 341/22; 84/423 R; 84/478; 84/479 A
(58) Field of Search .................................. 345/168, 169, 345/170, 176; 434/227, 233; 400/487, 489; 341/73, 20, 21, 22; 84/423 R, 478, 479 A (56) References Cited

U.S. PATENT DOCUMENTS

| | | | | |
|---|---|---|---|---|
| 4,909,739 A | | 3/1990 | Ladner et al. ............... 434/233 |
| 5,314,337 A | * | 5/1994 | Dixon ......................... 434/227 |
| 5,508,718 A | * | 4/1996 | Haikin ........................ 345/150 |
| 5,592,598 A | * | 1/1997 | Yamrom ...................... 434/227 |
| 5,675,407 A | * | 10/1997 | Geng .......................... 356/147 |
| 5,700,097 A | * | 12/1997 | Kuhlenschmidt ........... 434/227 |
| 5,734,498 A | * | 3/1998 | Krasieva et al. ............. 359/387 |
| 5,833,378 A | * | 11/1998 | Gibson ....................... 400/472 |
| 5,841,421 A | * | 11/1998 | Cheetam et al. ............. 345/150 |
| RE36,878 E | * | 9/2000 | Waitts et al. ................. 430/1 |

FOREIGN PATENT DOCUMENTS

| | | |
|---|---|---|
| GB | 1255754 | 12/1971 |
| GB | 228656 1 A | 8/1995 |

\* cited by examiner

*Primary Examiner*—Xiao Wu
*Assistant Examiner*—Abbas Abdulselam
(74) *Attorney, Agent, or Firm*—Robert P. Bell

(57) ABSTRACT

A data-entry device having manually operable input means arranged in zones for operation by corresponding fingers of a user. The device includes means for color coding such that each zone is assigned a color and successive zones display colors ordered according to their relative positions within a spectrum-ordered color pattern. In one embodiment the device includes a keyboard, such as for a computer or typewriter, wherein the keys of the keyboard are color-coded according to a spectrum-ordered color pattern. The invention also provides a method of color coding a data-entry device.

30 Claims, 1 Drawing Sheet

COLOR-CODED TACTILE DATA-ENTRY DEVICES

FIELD OF THE INVENTION

This invention relates generally to colour coding and more particularly to colour coding of tactile data-entry devices. The invention is applicable to computer or typewriter keyboards, cash registers, calculators, remote control mechanisms, telephone keypads or any other type of data-entry device having manually-operable input means intended to be actuated by the hand or hands of a user. It will be convenient to hereinafter describe the colour coding application in relation to computer keyboards, where the input means includes depressible keys, but it should be understood that the invention is intended for more general application and use.

BACKGROUND

Research by the inventor has established that computers are not used properly or to full potential. Computers are widely accepted as effective means of problem solving, however most users lack confidence in new applications and tend to be proficient only in repeated and familiar tasks, indicating functional fixedness—the inability to perceive better ways of performing tasks and realising that objects have functions other than familiar ones. In a nutshell computers, including keyboards, are not used properly because of inadequate user awareness and instruction. Very few users are aware of the finger-key zones necessary for effective use of keyboards and computers. Without this knowledge progress is slow and error-prone. Continued misuse causes difficult-to-reverse and dysfunctional development. For the individual this means slow-paced skill acquisition which retards proficiency, speed and accuracy, and user confidence.

The layout of keys on a modern computer keyboard is based on a "basic" typewriter keyboard configuration. That configuration has been accepted as a standard over many decades and defines the positions of keys on the keyboard. Generally, the "basic" typewriter keyboard has about fifty keys and does not include numeric, control, option, mode, start-up, cursor and function keys found on the modern "extended" or "101-plus" keyboard. The most common legends applied to the keys for identification purposes are the "QWERTY" and "Dvorak" legends, however there are many optional legends which may be utilised depending upon a user's specific requirements (eg. Japanese, Arabic, Swedish). The present invention is universally applicable to the "basic" or the "extended" keyboards and the various legends which apply to key identification.

The most widely-accepted method for efficient data input is the "touch-type" technique. To "touch-type" is to use the appropriate keying fingers without looking at the keyboard. However, the inventor's research has established that in excess of 99.95% of keyboard users do, and must, look at the modern "extended" or "101-plus" keyboard—visual consultation has become essential to keyboard users, regardless of an individual's proficiency level. That is because the modern keyboard has a far greater number and variety of keys and a larger, denser display area. Whilst the "basic" keyboard has almost fifty keys and can effect about eighty functions, the modern "extended" keyboard has in excess of one-hundred keys and can effect, potentially, thousands of distinct functions.

Traditional methods of teaching the "touch-type" technique limit the use and proficiency of the modem extended keyboard and its potentials because those methods only teach how to "touchtype" within the "basic" keyboard configuration where visual consultation is at a minimum. With the development of modern keyboards, and other data-entry devices, visual search has become essential to proficient use. Visual consultation of both keyboard and display monitor also play a vital role in the formative stages of learning to type (Cooper, 1983; Barrett & Krueger, 1994). The present invention acknowledges that the keyboard is a stimulus to users and that visual consultation is essential for developing effective usage.

In the "touch-type" technique the user places the fingers in the so-called "home" position in which each finger, from left to right, is placed on the home keys reading "ASDFJKL;" on a "QWERTY" legend keyboard or "AOEUHTNS" on a "Dvorak" legend keyboard. The thumbs are held over the space bar. Home keys are often identified through tactile guides attached to the keys. Each finger operates only those keys within the column defined by the home position, or in the case of the index fingers, also the adjacent columns containing keys on the home row reading G for the left hand and H for the right hand ("QWERTY" legend). "Finger-key zones" are thereby established, corresponding to the "home" position on the keyboard. The left and right "halves" of the keyboard should be used by the respective hands.

The benefits of the "touch-type" technique are that it develops proficiency, speed and accuracy through utilising the most efficient finger-key associations and the most economic kinesthetic-motor responses. The alternative "hunt and peck" method of typing produces difficult-to-reverse keying habits that limit speed and proficiency. It is therefore crucial to encourage the right motor responses (muscle memory) in the user at the earliest possible stage.

Various prior art systems have accordingly been developed in an attempt to teach users to "touch-type" correctly. However, those systems require the user to wear finger-guides in the form of upstanding labels worn on the back of the hands; or rings worn on each finger; or gloves. Finger guides and accessories indicate the relevant keys to be operated by each finger but have the disadvantage that they restrict movement of the typist's fingers or hands, block visual search and impair tactile feedback necessary for establishing correct motor skills (Cooper, 1983; Barrett & Krueger, 1994). Those systems are also restricted to basic keyboards and do not address extended keyboards used with computers.

Some of the prior art systems employ coloured decals or discs applied to the keys of a basic keyboard such that the keyboard is divided into a plurality of finger-key zones as described above. The keys within a particular zone are given a common colour, while the colour of each zone is different. Each finger is thereby associated with keys on the keyboard having a particular colour. By way of example, U.S. Pat. No. 3,501,849 to Olsen discloses finger-key zones from left to right having the colours: "red, blue, orange, green, yellow, pink, black, purple". U.S. Pat. No. 4,909,739 to Ladner et al. discloses the colours: "dark pink, yellow, violet, green, orange, blue, grey, light pink". WO94/01851 filed by Troudet discloses the colours: "pink, red, green, yellow and orange, yellow and orange, green, red, pink".

The benefits of colour-coded keyboards accordingly appear to be known and accepted but there has been no appreciation or understanding of the significance that colour selection and patterning can play in the cognitive processes involved in teaming and developing proper keying practices.

The present inventor on the other hand has recognized that colour selection and colour patterning can play a very significant role in enhancing the learning process and use habits.

SUMMARY OF THE INVENTION

The present invention utilises a spectrum-ordered colour pattern.

Throughout this specification the phrase "spectrum colours" is intended to denote all hues in the visible range of the electromagnetic spectrum which may be perceived by a human observer having normal colour vision. That phrase is intended to include all hues within the visible spectrum and is not limited to a number of defined colours or colour categories. The phrases "spectrum-ordered colour pattern" and "spectrum-ordered pattern" denote a pattern produced by spectrum colours when arranged according to their natural order in the electromagnetic spectrum.

In one aspect, the present invention provides a data-entry device having manually operable input means arranged in zones for operation by corresponding fingers of a user, the device including means for colour coding such that each zone is assigned a colour and successive zones display colours ordered according to their relative positions within a spectrum-ordered colour pattern.

In one embodiment the data-entry device includes a keyboard and the input means includes manually operable keys on the keyboard.

In another aspect, the present invention provides a colour-coded template for a tactile data-entry device having manually operable input means arranged in zones for operation by corresponding fingers of a user, the template including means for colour coding the input means such that each zone is assigned a colour and successive zones display colours ordered according to their relative positions within a spectrum-ordered colour pattern.

In a further aspect, the present invention provides a colour-coded membrane for overlaying a tactile data-entry device having a plurality of manually operable input means arranged in zones for operation by corresponding fingers of a user, the membrane including means for colour coding the input means such that each zone is assigned a colour and successive zones display colours ordered according to their relative positions within a spectrum-ordered colour pattern.

In a still further aspect, the present invention provides a method of colour coding a data-entry device having manually operable input means, the method including the steps of:

assigning to each operating finger of a user a colour, each colour being chosen such that successive fingers are assigned colours which are ordered according to their relative positions within a spectrum-ordered colour pattern;

arranging the input means in zones; and colour coding the input means such that each zone displays the colour assigned to its operating finger.

The data-entry device, and method of colour coding a data-entry device, according to the invention utilise means for colour coding which is based on psychological principles and the inventor's research findings.

The Gestalt "laws of organization" predict and govern perception of the elements that make up contour, colour, structure, and form in the perceptual (visual) field. Those elements are arranged through psychological processes into patterns with maximum organization (Koffka, 1935). The better the organization of the stimulus then the better its perception (Koffka, 1935). Perception requires that a stimulus in the perceptual field must contain some measure of heterogeneity (Wertheimer, 1923 in Koffka, 1935). Object segregation within the visual field is necessary for perception; it is not possible to discriminate an object without segregation. A visual field must contain a certain amount of redundant information, ensuring discrimination and contrast of objects and their structures (Attneave, 1954). Redundancy reduces uncertainty and error and contributes to improved organisation. Organisation emphasises the context and significance of the functionality of the stimulus. Greater organisation allows botter perception.

Effective and intelligent responses will always be as good as the prevailing conditions in the perceptual field permit (Koffka, 1935). Gestalt principles determine that a subject's perceptual field is segregated into psychologically-ordered parts that are most stable and simple or which create a minimum level of psychological and physiological stress (Forgus, 1966). Perceptual fields tend to be organised into a limited number of minor units. Grouping into smaller units encourages a chunking effect (Miller, 1956). Chunking allows information, like letters, syllables and words, to be grouped into familiar and manageable units which assist encoding, storage and recall (Lefton, 1994). Discrimination will be impaired if objects and their backgrounds have the same colour (Javadnia & Ruddock, 1988).

Psychophysiological factors are important considerations. Various theories propose the concept of neurophysiological memory traces. The input of information remains in a passive form as a trace. Recall and response involve a reactivation of a trace which, in effect, renews the same perceptual process and initiates responses consistent with the corresponding original input (Anderson & Bower, 1973). There is a transformation of unordered or poorly-organised memory traces into better-organised traces through repetition, indicating that memory and recall are also aided by good organisation in the perceptual field (Anderson & Bower, 1973). Good organisation in the perceptual field streamlines the neural processes associated with input, storage and retrieval of information (Restak, 1988). Kinesthesia, or motor memory, is the awareness of movement and position arising from repetition of motor activities. Finding keys on a keyboard is easier when a finger-colour-key location is familiar. That learned familiarity of movement and its repetition assists efficient and consistent motor coordination. Learning to use the keyboard proficiently can only occur through repetition, but repetition may lead to bad habits as well as good ones. One may easily start to learn wrongly and then acquire bad habits which will retard learning the activity correctly. In such cases repetition does not lead to optimum use (Koffka, 1935).

The development of skilled typing is characterized by a decreasing dependence on visual feedback accompanied by an increasing dependence on kinesthetic tactile feedback. Kinesthetic tactile feedback is the basis for making and confirming responses once learning has occurred utilising sensory stimuli, mainly vision (Barrett & Krueger, 1994; Gordon, Casabona & Soechting, 1994).

The colour-coded keyboard of the invention reveals the finger-key zones which enhance learning performance and develop the correct keying practices. The inventor's research indicates that at least ninety-five percent of "expert" touch-type-method typists don't use the extended keyboard properly. In acquiring the motor skills to key properly it is crucial to learn them correctly. Better use and, in particular, proper hand positioning minimizes the incidence of repetitive stress injuries like carpel tunnel syndrome, akinesia, and tenosynovitis (Cooper, 1983).

The use of colour is an important consideration for perception. The physiological and psychological benefits of colour use are well appreciated. Colour is as an extremely effective way of organising stimuli (Wickens & Andre, 1990) and an ideal means of segregating, defining and connecting units of stimuli (Davidoff, 1991). Segmentation through colour coding quickens visual search responses (Green & Anderson, 1956; Christ, 1975; Carter, 1982; Bundesen & Pedersen, 1983). Colour also aids the processing and recall of information, and of stimulus organization (Christ, 1975;. Colour coding also enhances memory performance (Siple & Springer, 1983).

Of the prior art colour-coded keyboards described above there appears to have been no importance placed on the particular colours used. It can be seen from the examples given that the colours were selected arbitrarily, with no emphasis on colour relationship or effective ordering and patterning.

In contrast, patterning plays a crucial role in the effectiveness of the present invention. Organisation through patterning is an efficient way of receiving, processing and recalling information. The organisation of a pattern is the basis on which discriminating and efficient responses may be made (Murch, 1973). The pattern which presents the best possible cues will have the best organisation (Koffka, 1935). Patterns have mnemonic advantages because they are more readily organised into conceptual units (Anderson, 1973). Patterns tend to compel one to perceive in certain ways; subjects tend to endow an object with the maximum regularity, symmetry, simplicity, continuity, inclusiveness and unification towards the best organization (Forgus, 1966). When there are several ways a pattern may be organized the simplest arrangement will be perceived most readily (McBurney & Collings, 1977). Good spatial arrangement of patterns facilitates organisation (Davidoff, 1991). Colours are an effective way of creating patterns. Discrimination between stimuli is easier if colour categories lie within information boundaries (Mullen & Kulikowski, 1990). Colouring and patterning when used together are compatible and do not lead to dysfunctional responses because they are processed separately (Javadnia & Ruddock, 1988). Brown & Monk (1975) and Carter, (1982) found that patterns quicken search response times because participants develop effective search strategies. Perceptual processes are improved when segregation of the units create conjunctions that act as means of separating the units and also as attentional cues for units that receive separate attention and are required for specific functions (Treisman, 1982) as in the case of the colour-coded finger-key zones of the invention.

The colour-coded keyboard of the present invention reveals, first, that the basic keyboard and the extended keyboard have organized configurations. The "within-stimulus" organisation is perceived through the arrangement of the coloured units and the pattern formed through the colour transition of those units. In the case of a computer keyboard, that colour transition is emphasised by the sloping columns, a natural complement to ergonomic design standards for keyboard configurations. The keys are segregated into zones by a spectrum-ordered colour pattern.

This spectrum-ordered pattern corresponds to the range of so-called "visible light" within the electromagnetic radiation spectrum (EMS). "Visible light" is "radiation" conceptualised at variant wavelengths of the EMS between the ultraviolet and infrared extremes of about 380 nanometres and 780 nanometres respectively (Marczenko,1966; Wurtman, 1975). Contemporary theories contend that colour is the psychological effect of electromagnetic radiation of different wavelengths, suggesting that objects appear coloured, via psychological processes, when they transmit radiation in the "visible" range.

The range of visible light may be subdivided into seven parametric bands of colours (Newton, 1730; Boring, 1942) corresponding to "focal regions" of the spectrum (Mervis, Catlin & Rosch, 1975; Heider, 1972). The focal regions are the purest examples of a colour and the most prominent (salient) parts of the spectrum (Heider, 1971; Neumann & D'Agostino, 1981) as opposed to the vague, low-contrasting boundaries between the focal regions which are either more difficult to distinguish or to name (Heider, 1971; Bornstein, 1976; Mullen & Kulikowski, 1990). The focal regions exhibit colours which may be categorised semantically as the colours: red, orange, yellow, green, blue, indigo and violet (MacIvor & LaForest, 1979; Gunstone & Osanz, 1994; Marshall 1991; Walker, 1991), being arranged in wavelength order corresponding to their natural positions in the electromagnetic spectrum (Boring, 1942; Ditchburn, 1961).

A colour-coded keyboard incorporating this subdivision of spectrum colours, based on the focal regions, provides maximum contrast and separation of the stimulus (the keys) whilst maintaining the integrity of the pattern. This pattern of spectrum colours accordingly constitutes a particularly preferred embodiment of the invention. The colour categories of the preferred embodiment may be conceptualised, using wavelength specifications for monochromatic light or hue angles on a colour wheel, as follows:

| Colour Category (effect) | Wavelength Range (approx. nm) | Focal Hue (approx. nm) | Hue Angle (colour wheel) |
|---|---|---|---|
| Red | 760–620 | 650 | 0° |
| Orange | 620–590 | 610 | 30° |
| Yellow | 590–545 | 575 | 60° |
| Green | 525–490 | 505 | 120° |
| Blue | 490–450 | 470 | 180° |
| Indigo | 450–420 | 440 | 240° |
| Violet | 420–380 | 405 | 300° |

These colours range around the Focal Hues which are the most salient example of that colour category. Due to their different molecular compositions, surface compounds emit various wavelengths of electromagnetic radiation. The perception of an "object's" colour is determined by the predominant wavelength emissions.

It has been found that stimulus perception can occur at various levels of scale (Duncan and Humphreys, 1989). In line with those findings the spectrum-ordered colour pattern enhances organization of the units at both the within-stimulus level and at the "whole-stimulus" level, where responses can be based on the perceived properties of the entire stimulus. "Homogeneity coding" occurs when a "target," in this case the spectrum-ordered colour pattern, as a unit at the whole-stimulus scale level, is applied to the stimulus which imparts an uniquely perceived integration of the sub-units (Duncan and Humphreys, 1989).

The preferred spectrum-ordered pattern of colours, as a whole, is perceived as an ordered pattern because its coloured sub-units, at columnar focal regions, provide information at intervals of a spatial gradient. A spatial gradient is a function of the relationship between the units of a sequence (Koffka, 1935). The strength of that relationship is a measure of the sequence's organization and hence a factor determining how readily a pattern may be perceived. An example of this is the sequence of integers: "1, 2, 3, 4, 5, 6, 7, 8" which is a more-readily perceivable pattern than: "1, 3, 2, 4, 5, 7, 6, 8".

Colour pattern discrimination relies on the detectability of gradients of colour that make up the units of a visual pattern (Fitts, 1966). Each unit's colour within the preferred colour pattern corresponds to each colour category's characteristic range of radiation. Those ranges may be represented as parameters of frequencies (λ) in Hertz (Wright, 1964), wavelength specifications in nanometres (Giancoli, 1980), hue angles on a colour wheel or colour-hue specifications as determined through the R.G.B., Munsell, Pantone, L*a*b*, C.I.E., CMYK or other colour determining system (Judd & Wyszecki, 1975). When the units of the preferred pattern are assigned rank-order values corresponding to their natural positions within the EMS a relationship is determinable. The colour coding of the preferred embodiment of the invention uses the focal region colours in the, "R-O-Y-G-B-I-V" ranked order:

| Rank | Colour | Order |
|------|--------|-------|
| $\lambda_a$ | (red) | 1, |
| $\lambda_b$ | (orange) | 2, |
| $\lambda_c$ | (yellow) | 3, |
| $\lambda_d$ | (green) | 4, |
| $\lambda_e$ | (blue) | 5, |
| $\lambda_f$ | (indigo) | 6, |
| $\lambda_g$ | (violet) | 7 |

($\lambda_x$ denoting rank corresponding to that colour's position in the spectrum and the numeral denoting the order of colours of a pattern which may be made from these colours). Relationship strength is established through the statistical measure: "Spearman's rank-order correlation coefficient" (Graziano & Raulin, 1989). The relationship between the colours of the preferred spectrumordered pattern, expressed as a correlation coefficient, is the maximum: $p=+1.00$. (The reverse rank-ordered pattern, "V-I-B-G-Y-O-R" also has the maximum: $p=+1.00$.) No other pattern could be perceived as readily because it would have a relationship indicating weaker stimulus organization. For example, the non-spectrum-ordered pattern, "Y-O-G-V-I-B-R":

| Rank | Colour | Order |
|------|--------|-------|
| $\lambda_a$ | (yellow) | 3, |
| $\lambda_b$ | (orange) | 2, |
| $\lambda_c$ | (green) | 4, |
| $\lambda_d$ | (violet) | 7, |
| $\lambda_e$ | (indigo) | 6, |
| $\lambda_f$ | (blue) | 5, |
| $\lambda_g$ | (red) | 1 | has a significantly weaker correlation, $p=+0.07$.

A colour coded keyboard made according to the preferred embodiment of the present invention includes the following finger-key zone colours:

| | Home Key Legend | | |
|---|---|---|---|
| Finger | QWERTY | Dvorak | Colour |
| left-hand pinky | A | A | red |
| left-hand ring finger | S | O | orange |
| left-hand middle finger | D | E | yellow |
| left-hand index finger | F,(G) | U,(I) | green |
| right-hand index finger | (H),J | (D),H | blue |
| right-hand middle finger | K | T | indigo |
| right-hand ring finger | L | N | violet |
| right-hand pinky | ; | S | pink |

The space bar, operated by the thumbs, may be given a pale neutral colour such as cream, light grey, or similar.

The colour pink, used for the right-hand pinky finger-key zone, has been introduced to meet the need for eight key-zones corresponding to the eight keying fingers and also to identify and further segregate the keys used by the right hand which requires movement from and to the home keys. Preferably, the pink is a "constant hue" (Burns, Elsner, Pokorny & Smith, 1984) being the same hue as the "red" used for the left-hand pinky but increased in lightness (desaturation). That colour scheme produces a relation between the pinky fingers whereby the terminal hues of the pattern are the same; they lie on the same radial hue-angle of a colour wheel but have unequal lightness. The colour pink also has a mnemonic advantage as it is naturally related to the "pinky" finger of the right hand.

In a study conducted to assess the effectiveness of a spectrum-ordered colour-coded computer keyboard the inventor found that the keyboard showed clear benefits for users in the acquisition of keyboarding skills and the development of keyboarding proficiency. Forty-eight casual users of keyboards participated in the study. Three QWERTY-legend keyboards were used: a standard achromatic keyboard, a randomly colour-coded keyboard and a spectrum-ordered colour-coded keyboard. The participants were independently required to type a test paragraph using the standard keyboard to enable baseline speed and accuracy scores to be obtained. Participants were then divided into two groups: the control group used the randomly colour-coded keyboard, whilst the experimental group used the spectrunm-ordered colour-coded keyboard. The test paragraph was again used to obtain overall speed and accuracy scores on three consecutive occasions.

It was found that the group using the spectrum-ordered keyboard consistently scored higher than the group using the randomly colour-coded keyboard, and showed consistent improvement over time. The results indicated a mean net gain of 5.13 words per minute for the spectrum-ordered keyboard compared to a mean net gain of 2.27 words per minute for the randomly colour-coded keyboard. These results present a 195% difference in improvement between the groups over time, thereby demonstrating that the spectrum-ordered keyboard functions as an aid to the acquisition of keying proficiency.

In an alternative embodiment of the invention, also based on the seven focal region colours, a colour other than pink may be used for the eighth keying finger. In one embodiment a non-colour such as black, white or a shade of grey may be used. The non-colour may be used in place of pink for the right-hand pinky finger, or it may be used for the left hand pinky finger, with the seven focal region colours then being shifted to the right by one finger.

In another embodiment of the invention, the spectrum colours may be reversed. From left to right the colours associated with the eight keying fingers may be as follows: pink, violet, indigo, blue, green, yellow, orange and red. Again, the pink may be replaced by black, white or a shade of grey, and may be at either end of the pattern. This ordered pattern of colours may also be used on "left-handed" keyboards, which are a mirror image of conventional keyboards.

In a further embodiment of the invention, a colour coded keyboard may display an ordered pattern of eight successive or non-successive spectrum colours. In one example, colour hues between the preferred focal region colours may be employed. Such a pattern may not provide the maximum perceived contrast and separation between the finger-key zones of the keyboard but, nevertheless, the spectrum-ordered pattern enhances organization of the keyboard as a stimulus to the user, thereby assisting more efficient input, storage and recall of information.

Colour coding of the keys, or their columns, may be achieved in a variety of ways. In one embodiment the sides of upstanding keys may be painted or printed with the appropriate colour for each key-zone. Alternatively, the keys may be made of a suitable coloured material such as coloured plastic. The keys may advantageously be made of a translucent coloured material and back-lit to emit light of the appropriate colour.

In an alternative embodiment of the invention the means for colour coding may be in the form of a colour-coded membrane for overlaying the keys of a standard keyboard. Alternatively, the means for colour coding may be in the form of a rigid or semi-rigid template surrounding the keys such that finger-key zones are indicated by a background surrounding colour.

In a further embodiment, the keyboard may be of the membrane type wherein each "key" is an elastomeric diaphragm switch assembly. In such a keyboard the elastomeric diaphragm may be colour coded.

Preferably all of the keys of an "extended" computer keyboard are colour coded using the same coding as applied to the "basic" section of the keyboard. The colours displayed may be chosen to indicate the relevant fingers to be used to operate the additional keys, such as the numerical keypad, control, mode, option, start-up, cursor arrow and function keys.

Advantageously, finger-key zone indicators may be applied to the keyboard so as to indicate which finger is to be used for each finger-key zone. Such indicators may be in the form of a hand symbol having the relevant finger coloured the appropriate colour. Preferably the indicators are placed at the top of each column comprising a finger-key zone. The indicators may be applied to the surface material of the keyboard by any suitable process such as embossing, screen printing, decal or transfer.

The fundamental problem with keyboards having poorly-defined organization (without colour, motor-, memory- or search-aiding enhancements) is that they are perceived as homologous visual fields. Their low-level organization does not confirm an order or break down the whole into its integral parts which is necessary for efficient information processing. Accordingly, as a stimulus their effectiveness is limited. Their low level of organization overwhelms a user, retarding search efficiency and proper motor development. Breaking down the whole into its integral parts aids awareness of the purpose and functionality behind the keyboard's design configuration. Distribution of the segregated parts of the keyboard by colour coding facilitates better awareness of the integrated whole.

Incorporating visual search, motor- and memory-aiding devices by colour coding effectively introduces meaningful relations between the to-be-remembered information and the responses to be realized. The quality of response, in this case one's keying skills including speed, accuracy and proficiency, is relative to the quality and strength of the organisation in the perceptual field—the keyboard—and the processes in learning and developing its usage. The higher the level of organisation, the greater the streamlining of the neural processes which assists in more efficient input, storage and recall responses. The high-level organisation of the preferred rank-ordered focal region spectrum colours provides the strongest-possible cues and yields the best-possible responses, adapting the neural mechanisms to process information with maximum economy and efficiency, thereby leading to greater user confidence through speed, accuracy and proficiency.

The colour coding application of the invention has unique advantages which are directly attributable to the high level of organisation realized through the use of the spectrum-ordered colour patterning. The preferred colour pattern, based on the focal regions of the spectrum, has the following improvements:

1) It is the most expediently perceived pattern of colours. This is because the preferred spectrum-ordered pattern of colour coding is the most organized pattern. This pattern has the strongest possible relationship because it provides the highest level of within-stimulus pattern contrast, indicating its optimal organizational properties.

2) The preferred spectrum-ordered pattern corresponds to the "rainbow" pattern which is instantly recognisable, providing more information at both the within-stimulus and whole-stimulus levels than unfamiliar patterns, and thereby increasing organisation of the keyboard.

3) It is the simplest pattern. The preferred spectrum-ordered pattern is the simplest pattern that can fulfil maximum organization of the units of the keyboard or input device. It is the only familiar pattern with rank-ordered colours.

A colour-coded keyboard incorporating the colour coding pattern of the invention has the following practical advantages:

It provides an immediate introduction to the order and the finger-key zones of the keyboard.

Novice, casual and expert users become aware of its function immediately.

It acts as an heuristic guide, encouraging users to pursue correct usage of the keyboard.

It introduces the home keys and mapsut their corresponding key zones.

It acts as a constant and permanent reminder of the correct means of use.

Users will automatically learn finger-key associations which are necessary for learning to "touch-type". That stops the establishment of difficult-to-ireverse keying habits.

It encourages correct muscle memory.

It reduces the incidence of physiological and psycho-physiological injuries by stabilizing the keying hand at its correct location, thereby isolating finger movement to within the appropriate key-zone and minimizing hand and arm movement.

No accessories are needed.

The colour coding pattern of the invention is universally suited to all keyboards and tactile-encoding devices such as on telephones, calculators, cash registries and the like. For example, the push buttons of a calculator or the numerical keypad of a computer keyboard are typically arranged in four columns with the first three columns from the left-hand side containing an array of numerical keys and the right-most column containing mathematical operands. Such keypads are usually designed for right-handed operation and in the preferred colour coding of the invention would be coloured, from left to right: blue, indigo, violet and pink. However, other colours exhibiting a spectrum-ordered pattern of colours may also be used. For example, four successive focal region colours may be used, (eg. yellow, green, blue, indigo) or four non-successive focal region colours may be used (eg. red, yellow, blue, violet). Alternatively, non-focal region spectrum-ordered colours may be used.

The colour coding pattern may also be utilised on keypads having only three columns, such as on a typical telephone. In this instance, three successive spectrum colours may be used. Advantageously the colours blue, indigo and violet are used, corresponding to the colours of computer keyboard keys operated by the first three fingers of the right hand. However, three other successive or non-successive spectrum-ordered colours may be used. Those colours may or may not be focal region colours.

In further embodiments of the invention, five, six or seven finger-key zones may be colour coded and any sequence of spectrum-ordered colours may be employed. The selected colours may or may not be focal region colours and need not be equally spaced within the visible spectrum.

In an alternative embodiment of the invention, the keys of a keypad may be configured as an array having rows and columns, and being arranged such that each row (or group of rows) forms a key-zone. Each zone is a different colour and successive zones display colours according to a spectrum-ordered pattern of colours. From top to bottom, the colours may be arranged in ascending or descending ranked order. In this embodiment the keying fingers are again positioned for operation of keys within respective zones.

It will be convenient to hereinafter describe the invention by reference to the accompanying drawings which illustrate a preferred embodiment. Other embodiments of the invention are possible, and consequently the particularity of the accompanying drawings is not to be understood as superseding the generality of the preceding description of the invention.

DETAILED DESCRIPTION OF PREFFERED EMBODIMENTS

Figure 1:
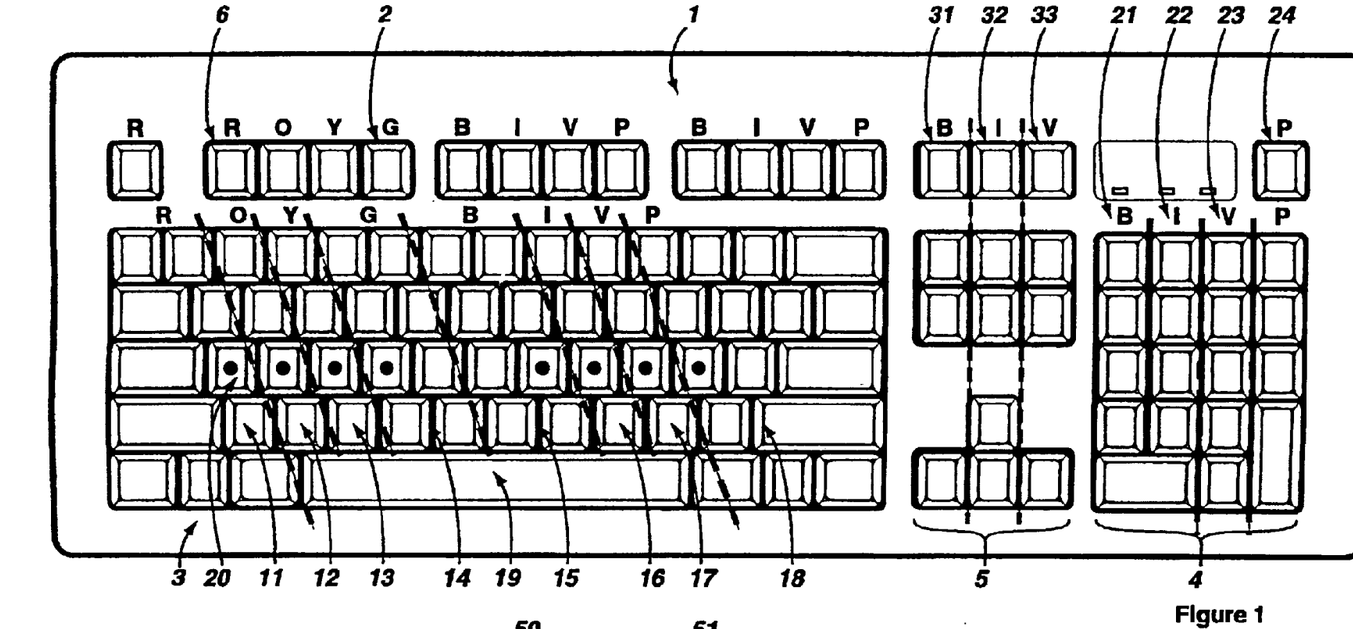
FIG. 1 shows a plan view of a computer keyboard incorporating the preferred colour coding pattern of the invention.

Referring to the drawings, FIG. 1 shows a data-entry device in the form of a computer keyboard 1 having a standard configuration of keys 2. The keyboard 1 includes a basic or alphabetical keyboard 3, numerical keypad 4, control keys 5 and function keys 6.

The basic keyboard 3 is similar to a typewriter keyboard and includes keys 2 arranged in columnar key-zones 11 to 18. Key-zones 11 to 18 correspond to the eight keying fingers of a typist using the "touch-type" technique. For each finger, the "home" key 20 within each zone is indicated in FIG. 1 with a black dot. These dots are provided for present reference purposes only and are not part of the actual keyboard legend. The home keys on a "QWERTY" keyboard correspond to the keys reading "ASDFJKL;". However, these keys may have different labels depending on the purpose and language of the keyboard or input device.

As shown in FIG. 1, key-zones 11 to 18 are colour coded using the spectrum-ordered colours. The keying finger corresponding to each coloured key-zone is as follows:

| Key Zone | Finger | Colour |
| --- | --- | --- |
| 11 | left-hand pinky | red |
| 12 | left-hand ring finger | orange |
| 13 | left-hand middle finger | yellow |
| 14 | left-hand index finger | green |
| 15 | right-hand index finger | blue |
| 16 | right-hand middle finger | indigo |
| 17 | right-hand ring finger | violet |
| 18 | right-hand pinky | pink |

Each keying finger is thus associated with a particular colour and with keys 2 in a particular key-zone of the alphabetical keyboard 3 having that colour. The space bar 19, operated by either thumb, is given a neutral colour such as black, white, cream, grey, or similar.

The numerical keypad 4 includes key-zones 21 to 24 arranged generally in four columns for operation by four keying fingers of the right hand of a user. The key-zones are colour-coded as follows:

| Key Zone | Finger | Colour |
| --- | --- | --- |
| 21 | right-hand index finger | blue |
| 22 | right-hand middle finger | indigo |
| 23 | right-hand ring finger | violet |
| 24 | right-hand pinky | pink |

It will be noted that this colour coding is the same as that used for the right-hand keying fingers on the alphabetical keyboard 3.

The control keys are similarly arranged in key-zones 31 to 33 for operation by three keying fingers as follows:

| Key Zone | Finger | Colour |
| --- | --- | --- |
| 31 | right-hand index finger | blue |
| 32 | right-hand middle finger | indigo |
| 33 | right-hand ring finger | violet |

The row of function keys 6 above the alphabetical keyboard 3 is colour coded as shown in FIG. 1 to indicate to the user that the left-most group of four keys is to be operated by the left hand and the middle and right-most groups of four keys are to be operated by the right hand. It will be appreciated however that different colours may be used to instruct the user to use different fingers.

For computer and typewriter keyboards the preferred spectrum-ordered pattern of coloured zones, with the additional mnemonic pink for the "pinky" finger's zone, conforms to the essential need to segregate eight finger-key zones to correspond with the eight keying fingers (space-thumb bar excluded).

The present invention thus allows a computer or keyboard manufacturer or software producer to direct a user to use particular fingers in the operation of the system or software by providing a colour-coded keyboard or colour-coded overlay or template for a standard keyboard.

The finger-colour association is preferably the same across the whole keyboard. The "touch-type" technique encourages the user to very quickly learn the appropriate fingers to be used for all keys of an extended computer keyboard, not just the basic keyboard. Users quickly associate the colours with respective fingers. This means that the finger guides and accessories of the prior art are unnecessary.

Figure 2:
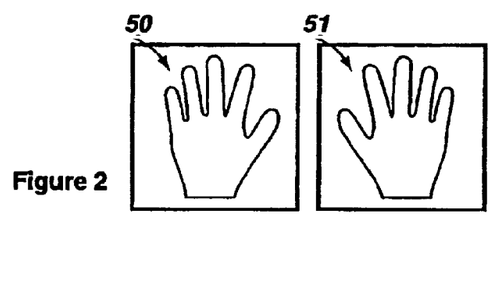
FIG. 2 shows one form of finger-key-zone indicators which may be applied to the key-zones of the keyboard shown in FIG. 1.

If however it is considered appropriate, the present invention envisages that finger-key-zone indicators may be displayed on the keyboard at the top of each column or group of columns comprising each key-zone. FIG. 2 shows a finger-key-zone indicator 50 for the left hand and a finger-key-zone indicator 51 for the right hand. In use, the appropriate finger of each indicator is coloured, so as to show the relevant finger to be used in each key-zone. For example, left-hand indicator 50 is applied to the keyboard above the red keys in key-zone 11 and has the pinky finger coloured red. The same indicator is used above key-zone 12 but has the ring finger coloured in orange. All other key-zones of the keyboard may be similarly marked.

Those skilled in the art will appreciate that various adaptations and modifications of the just-described preferred embodiment can be produced without departing from the spirit and scope of the invention. Therefore, it is to be understood that the invention may be practiced other than as specifically described herein.

The annexed references are incorporated herein by cross reference.

References

Anderson, J. R., & Bower, G. H. (1973). Human associative memory. New York: Winston & Sons.

Attneave, F. (1954). Some informational aspects of visual perception. Psychological Review. 61,183–193.

Barrett, J., & Krueger, H. (1994). Performance effects of reduced proprioceptive feedback on touch typists and casual users in a typing task. Behavior and Information Technology, 13, (6), 373–381.

Boring, E. G. (1942). Sensation and perception in the history of experimental psychology. New York: Appleton-Century.

Bornstein, M. H. (1976). Name codes and colour memory. American Journal of Psychology, 89(2), 269–279.

Brown, B., & Monk, T. M. (1975). The effect of local target surround and whole background constraint on visual search times, Human Factors, 17, 81–88.

Bundesen, C., & Pedersen, L. F. (1983). Color segregation and visual search. Perception and Psychophysics, 33, 487–493.

Burns, S. A., Elsner, A. E., Porkony, J., & Smith, V. C. (1984). The abney effect: Chromacticity coordinates of unique hues and other constant hues. Vision Research, 24, (5), 479–489.

Carter, R. C. (1982). Visual search with colour. Journal of Experimental Psychology: Human Perception and Performance, 8, 127–136.

Christ, R. E. (1975). Review and analysis of color coding research for visual displays. Human Factors, 17, 542–570.

Cooper, W. E. (1983). (Ed.) Cognitive aspects in skilled typing. New York: Springer-Verlag.

Davidoff, J. B. (1991). Cognition through color. Cambridge, Mass: The MIT Press.

Ditchburn, R. W. (1961). Light. New York: Interscience.

Duncan, J., & Humphreys, G. W. (1989). Visual search and stimulus similarity. Psychological Review, 96, (3), 433–458.

Fitts, P. M. (1956), Engineering psychology and equipment design. In Stevens, S. S. (8th ed.) (Vol. Ed.), Handbook of experimental psychology, New York: John Wiley & Sons.

Forgus, R. H. (1966). Human perception: The basic process in cognitive development. New York: McGraw-Hill.

Giancoli, D. C. (1980). Physics: principles and applications. New Jersey: Prentice-Hall Inc.

Gordon, A. M., Casabona, A., & Soechting, J. F. (1994). The learning of novel finger learning sequences. Journal of Neurophysiology 72, (4), 1596–1610.

Graziano, A. M., & Raulin, M. L. (1989). Research methods: a process of inquiry. New York: Harper Collins.

Green, B. F., & Anderson, L. K. (1956). Color coding in a visual search task. Journal of Experimental Psychology, 51, (1), 19–24.

Gunstone, J., & Osanz, P. (1994). Colour therapy. Ringwood, Australia: Viking-Penguin.

Heider, E. (1971). Natural categories. Cognitive Psychology, 4, 328–350.

Heider, E. (1972). Universals in colour naming and memory. Journal of Experimental Psychology. 93(1), 10–20.

Javadnia, A., & Ruddock, K. H. (1988). Simultaneous processing of spatial and chromatic components of patterned stimuli by the human visual system. Spatial Vision, 3, (2), 115–117.

Judd, D. B., & Wyszecki, G. (1975). Color in business, science and industry. (3rd ed.). New York: Wiley & Sons, Kofika, K. (1935). Principles of gestalt psyghology. New York: Harcourt Brace & World.

Lefton, L. A. (1994). Psychology. (5th ed.). Needham Heights, Me.: Allyn & Bacon.

McBurney, D. D., & Collings, V. (1977). Introduction to sensation/perception. New Jersey: Prentice-Hall.

Maclvor, V., & LaForest, S. (1974). Vibrations. New York: Samuel Wieser, Inc.

Marczenko, Z. (1986). Separation and spectrophotometric determination of elements. (2nd ed.) Chichester, England: Ellis Horward Ltd.

Marshall, J. C. (1991). Long live VIBGYOR. Foreword in, Cognitin through color. Cambridge, Mass.: The MIT Press.

Mervis, C. B., Catlin, J., & Rosch, E. (1975), Development of the structure of colour categories. Developmental Psychology, 2(1), 54–60.

Miller, G. A. (1956). The magical number seven, plus or minus two: some limits on our capacity for processing information. Psychological Review, 63, 81–97.

Mullen, K. T., & Kulikowski, J. J. (1990). Wavelength discrimination at detection threshold. Journal of the Optical Society of America, 7A, 733–742.

Murch, G. M. (1973). Visual and auditory perception. New York: Bobbs-Merrill.

Neumann, K. M., & D'Agostino, P. R. (1981). Specificity of mental colour codes. American Journal of Psychology, 94(3), 451–459.

Newton, I. (1730/1979). Opticks (4th ed.), London:Smith/ New York: Dover.

Restak, R. M. (1988). The mind. New York: Bantam Books.

Siple, P., & Springer, R. M. (1983). Memory and preference for the colors of objects. Perception,and Psychophsyics,34, 363–370.

Treisman, A. (1982). Perceptual grouping and attention in visual search for features and for objects. Journal of Experimental Psychology: Human Perception and Performance, 8, (2), 194–214.

Walker, P. M. B. (Ed.). (1991). Chambers science and technology dictionary. New York: W & R Chambers Ltd.

Wickens, C. D., & Andre, A. D. (1990). Proximity, compatibility and information display: Effects of colour, space and abjectness on information integration. *Human Factors*, 32, 61–71.

Wright, W. D. (1964). *The measurement of colour*. London, Hilger & Watts.

Wurtman, R. J. (1975). The effects of light on the human body. *Scientific American*, 23, (1), 68–77.

What is claimed is:

1. A tactile data-entry device comprising:

manually operable input means arranged in a plurality of zones for operation by corresponding fingers of a user, means for color coding at least a portion of the plurality of zones of said input means, to provide a visual contrast and separation between each of the portion of the plurality of said zones, wherein said color coding is arranged such that each of the portion of the plurality of zones is assigned a color that is distinguishable from an adjacent other of the portion of the plurality of zones, and wherein successive ones of the portion of the plurality of zones display colors that form a spectrum-ordered color pattern in which said colors are arranged in order of successively increasing wavelengths such that each of the zones in the portion of plurality of zones bordered by at least two adjacent zones in the portion of plurality of zones has an associated color having a wavelength higher than one adjacent zone and lower than another adjacent zone.

2. The tactile data-entry device of claim 1, wherein the portion of the plurality of zones comprises seven successively adjacent zones, and the colors of the seven successively adjacent zones are respectively red, orange, yellow, green, blue, indigo, and violet.

3. The tactile data-entry device of claim 2, wherein the colors correspond substantially to perceived hues associated with monochromatic light having wavelengths ranges in nanometres ordered as follows:

|        |         |
|--------|---------|
| red    | 760–720 |
| orange | 620–590 |
| yellow | 590–545 |
| green  | 525–490 |
| blue   | 490–450 |
| indigo | 450–420 |
| violet | 420–380.|

4. The tactile data-entry device of claim 3, wherein the colors correspond substantially to perceived hues associated with monochromatic light having wavelengths in nanometres ordered as follows:

|        |     |
|--------|-----|
| red    | 750 |
| orange | 610 |
| yellow | 575 |
| green  | 505 |
| blue   | 470 |
| indigo | 440 |
| violet | 405.|

5. The tactile data-entry device of claim 2, wherein colors correspond substantially to hues angles on a color wheel, ordered as follows:

|        |      |
|--------|------|
| red    | 0°   |
| orange | 30°  |
| yellow | 60°  |
| green  | 120° |
| blue   | 180° |
| indigo | 240° |
| violet | 300°.|

6. The tactile data-entry device of claim 2, wherein said input means comprises a keyboard, and said means for color coding includes surface coloring applied to the keyboard such that each operating finger is assigned a different color on the keyboard as follows:

|                         |        |
|-------------------------|--------|
| left-hand pinky         | red    |
| left-hand ring finger   | orange |
| left hand middle finger | yellow |
| left hand index finger  | green  |
| right hand index finger | blue   |
| right hand middle finger| indigo |
| right hand ring finger  | violet |
| right hand pinky        | pink.  |

7. The tactile data-entry device of claim 1 wherein said means for color coding include a color-coded membrane for overlaying the input means.

8. The tactile data-entry device of claim 1 wherein said means for color coding include a color-coded template associated with the input means.

9. The tactile data-entry device of claim 1 wherein the input means include a plurality of depressible keys.

10. The tactile data-entry device of claim 1 wherein the input means include a plurality of elastomeric diaphragm switch assemblies.

11. The tactile data-entry device of claim 1 wherein the input means is arranged as an array including rows and columns, and each column or predetermined group of columns forms one of said plurality of zones.

12. The tactile data-entry device of claim 1 wherein the device includes a computer keyboard and the input means include a plurality of manually operable keys on the computer keyboard.

13. The data-entry device of claim 12 wherein the computer keyboard includes an alphabetical keyboard having eight successive zones associated with eight keying fingers of the user and wherein said zones display, from left to right or right to left, the following ordered colors: red, orange, yellow, green, blue, indigo, violet and pink.

14. The tactile data-entry device of claim 1, wherein the computer keyboard includes an alphabetical keyboard and the plurality of zones comprises eight successive adjacent zones associated with eight keying fingers of the user and where said eight successive adjacent zones display from left to right or right to left, the following ordered colors: red, orange, yellow, green, blue, indigo, violet and pink.

15. The tactile data-entry device of claim 12 wherein the computer keyboard includes a numerical keypad having four successive zones associated with four keying fingers of the user, and wherein the four zones display four colors selected from and ordered according to the following: red, orange, yellow, green, blue, indigo, violet and pink.

16. The tactile data-entry device of claim 14 wherein the selected colors are: blue, indigo, violet and pink.

17. The tactile data-entry device of claim 12 wherein the computer keyboard includes respective groups of function keys, cursor positioning keys and control keys, each group having a plurality of successive zones associated with corresponding keying fingers of the user, and wherein the zones within each group display colors selected from and ordered according to the following: red, orange, yellow, green, blue, indigo, violet and pink.

18. The tactile data-entry device of claim 1 wherein the device includes a numerical keypad and the input means includes manually operable keys on the keypad.

19. The tactile data-entry device of claim 17 wherein the keypad includes three successive zones associated with three keying fingers of the user, and wherein the three zones display three colors selected from and ordered according to the following: red, orange, yellow, green, blue, indigo, violet and pink.

20. The tactile data-entry device of claim 18 wherein the selected colors are: blue, indigo and violet.

21. The tactile data-entry device of claim 18 wherein the selected colors are: orange, yellow and green.

22. The tactile data-entry device of claim 1 further including indicators associated with each zone for designating to the user which finger is to be used for each zone.

23. The tactile data-entry device of claim 21 wherein the indicators are in the form of hand symbols having the relevant finger associated with each zone being the same color as the color assigned to that zone.

24. A color-coded template for a tactile data-entry device having a plurality of manually operable input means arranged in a plurality of zones for operation by corresponding fingers of a user, the template comprising:

means for color coding at least a portion of the plurality of zones of said input means, to provide a visual contrast and separation between each of the portion of the plurality of said zones, wherein said color coding is arranged such that each of the portion of the plurality of zones is assigned a color that is distinguishable from an adjacent other of the portion of the plurality of zones, and wherein successive ones of the portion of the plurality of zones display colors that form a spectrum-ordered color pattern in which said colors are arranged in order of successively increasing wavelengths such that each of the zones in the portion of plurality of zones bordered by at least two adjacent zones in the portion of plurality of zones has an associated color having a wavelength higher than one adjacent zone and lower than another adjacent zone.

25. The color-coded template of claim 23 wherein the data-entry device includes a computer keyboard having depressible keys and the template is adapted to surround individual or groups of the depressible keys.

26. A color-coded membrane for overlaying a tactile data-entry device having a plurality of manually operable input means arranged in a plurality of zones for operation by corresponding fingers of a user, the membrane comprising:

means for color coding at least a portion of the plurality of zones of said input means, to provide a visual contrast and separation between each of the portion of the plurality of said zones, wherein said color coding is arranged such that each of the portion of the plurality of zones is assigned a color that is distinguishable from an adjacent other of the portion of the plurality of zones, and wherein successive ones of the portion of the plurality of zones display colors that form a spectrum-ordered color pattern in which said colors are arranged in order of successively increasing wavelengths such that each of the zones in the portion of plurality of zones bordered by at least two adjacent zones in the portion of plurality of zones has an associated color having a wavelength higher than one adjacent zone and lower than another adjacent zone.

27. A method of color coding a tactile data-entry device having a plurality of manually operable input means, the method comprising the steps of:

arranging the input means in a plurality of zones for operation by corresponding fingers of a user;

color coding at least a portion of the plurality of zones of the input means, to provide a visual contrast and separation between each of the portion of the plurality of the zones, wherein the color coding is arranged such that each of the portion of the plurality of zones is assigned a color that is distinguishable from an adjacent other of the portion of the plurality of zones, and wherein successive ones of the portion of the plurality of zones display colors that form a spectrum-ordered color pattern in which the colors are arranged in order of successively increasing wavelengths such that each of the zones in the portion of plurality of zones bordered by at least two adjacent zones in the portion of plurality of zones has an associated color having a wavelength higher than one adjacent zone and lower than another adjacent zone; and assigning to each operating finger of the user the color of the corresponding zone such that successive fingers are assigned colors which are ordered according to their relative positions within the spectrum-ordered color pattern.

28. The method of claim 26, wherein said device includes a computer keyboard and said input means includes manually operable keys on said keyboard.

29. The method of claim 26, wherein the color assigned to each operating finger is as follows:

| | |
|---|---|
| left-hand pinky | red |
| left-hand ring finger | orange |
| left-hand middle finger | yellow |
| left-hand index finger | green |
| right-hand index finger | blue |
| right-hand middle finger | indigo |
| right-hand ring finger | violet |
| right-hand pinky | pink. |

30. The method of claim 26, wherein the color associated to each operating finger is as follows:

| | |
|---|---|
| left-hand pinky | pink |
| left-hand ring finger | violet |
| left-hand middle finger | indigo |
| left-hand index finger | blue |
| right-hand index finger | green |
| right-hand middle finger | yellow |
| right-hand ring finger | orange |
| right-hand pink | red. |

* * * * *